United States Patent [19]
Divan et al.

[11] Patent Number: 5,224,025
[45] Date of Patent: Jun. 29, 1993

[54] FORWARD CONVERTER WITH TWO ACTIVE SWITCHES AND UNITY POWER FACTOR CAPABILITY

[75] Inventors: Deepakraj M. Divan; Giri Venkataramanan, both of Madison, Wis.

[73] Assignee: Wisconsin Alumni Research Foundation, Madison, Wis.

[21] Appl. No.: 871,719

[22] Filed: Apr. 21, 1992

[51] Int. Cl.[5] .................... H02M 1/12; H02M 3/335
[52] U.S. Cl. ....................................... 363/16; 363/34; 323/207
[58] Field of Search ................... 363/16, 24, 25, 26, 363/34, 37, 133, 134; 323/207

[56] References Cited

U.S. PATENT DOCUMENTS

| | | |
|---|---|---|
| 4,415,959 | 11/1983 | Vinciarelli . |
| 4,437,146 | 4/1984 | Carpenter . |
| 4,441,146 | 4/1984 | Vinciarelli . |
| 4,559,590 | 12/1985 | Davidson . |
| 4,675,797 | 6/1987 | Vinciarelli . |
| 4,845,605 | 7/1989 | Steigerwald . |
| 4,868,730 | 9/1989 | Ward . |
| 4,947,308 | 8/1990 | Gulczynski . |
| 4,949,234 | 8/1990 | Gulczynski . |
| 4,956,760 | 8/1990 | Gulczynski . |
| 4,959,764 | 9/1990 | Bassett . |
| 5,038,267 | 8/1991 | DeDoncker et al. . |
| 5,057,990 | 10/1991 | Gulczynski . |
| 5,066,900 | 11/1991 | Bassett ........................... 363/16 X |

OTHER PUBLICATIONS

K. Kit Sum, "Power Factor Correction for Single Phase Input Power Supplies," PCIM, Dec. 1989, pp. 18–23.

C. C. Chen, et al., "Simple Topologies for Single Phase Line Conditioning," Conference Record, IEEE–IAS Annual Meeting, 1991.

*Primary Examiner*—Emanuel T. Voeltz
*Attorney, Agent, or Firm*—Foley & Lardner

[57] ABSTRACT

A power converter integrates an input boost converter and an output forward converter into a single power stage utilizing only two active switches. AC input power is provided through a rectifier to an input inductor which supplies current to a main node. The diode is connected from a main node to a DC bus supply line and current is returned to the rectifier by DC bus return line. An energy storage capacitor and a series connected switching device and diode are connected across the DC bus lines. A second control switching device is connected from the main node to the DC bus return line. The primary of a high frequency transformer is connected between the main node and the junction between the first switching device and diode, and the secondary of the transformer is connected to an output circuit which includes a rectifier and an inductor and capacitor filter to provide a DC output voltage to a load. When both switching devices are turned off, current from the input inductor is supplied to charge up the energy storage capacitor and to drive the transformer magnetizing current to zero. Turn on of both switching devices causes the capacitor to be discharged via the switching devices through the primary of the transformer to supply power to the load. Intermediate modes in which one or the other of the switching devices is on while the other is off are available. By proper selection of the time of turn on of the devices and the modes of switching of the devices, the AC input current can be controlled to be substantially sinusoidal, or the output voltage can be controlled to a selected level, and in either event the power factor as seen at the AC input lines is substantially unity.

8 Claims, 5 Drawing Sheets

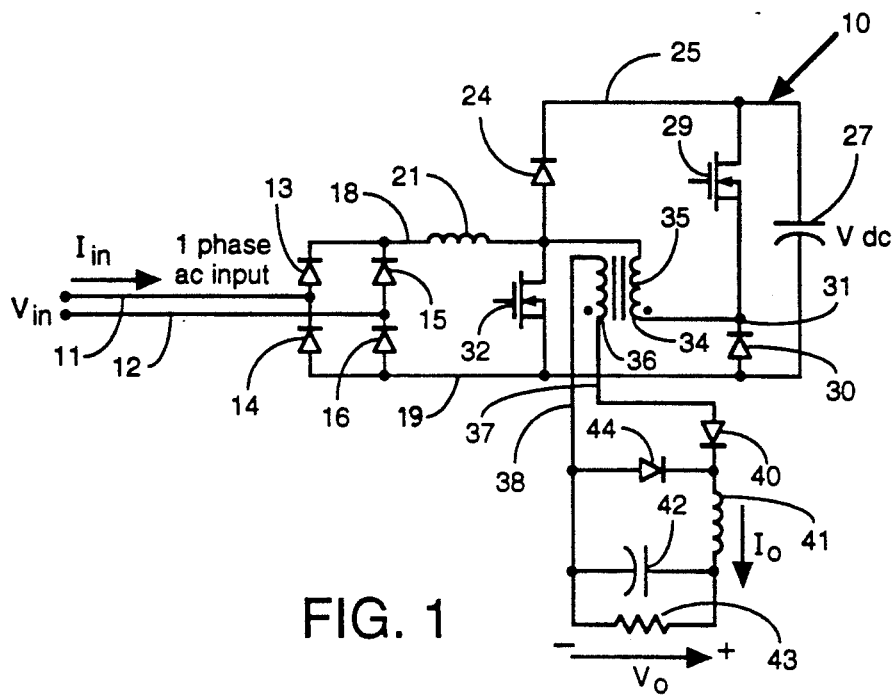
FIG. 1
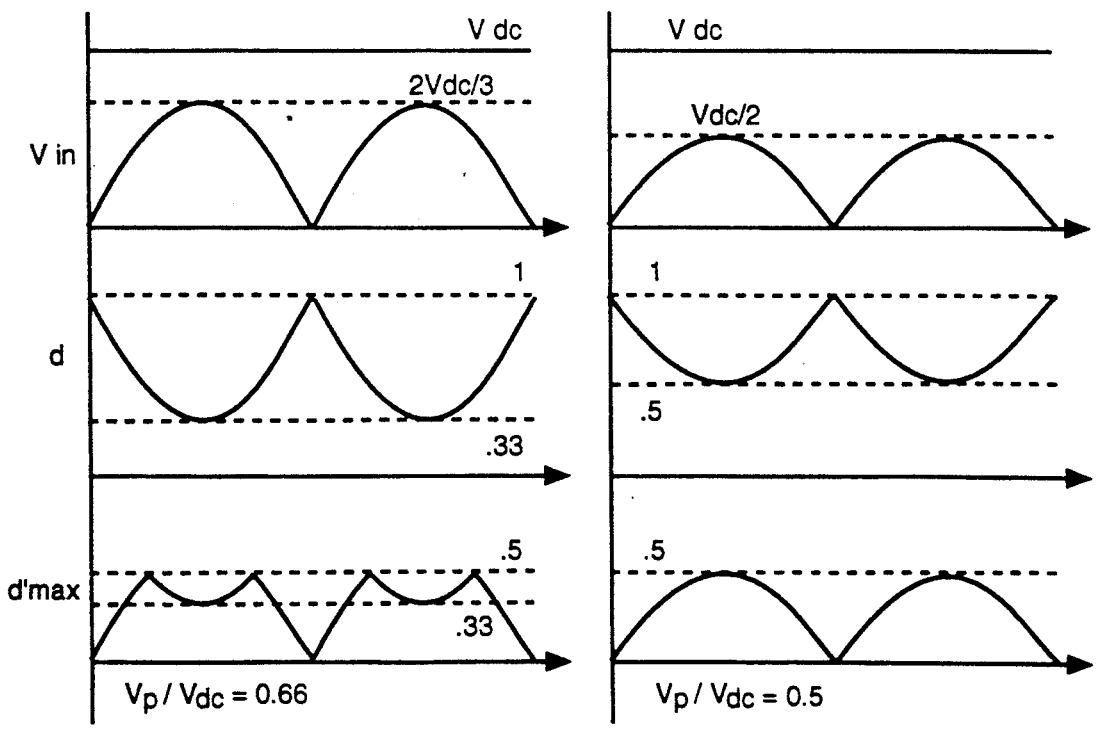
FIG. 2
FIG. 3

FORWARD CONVERTER WITH TWO ACTIVE SWITCHES AND UNITY POWER FACTOR CAPABILITY

FIELD OF THE INVENTION

This invention pertains generally to the field of electrical power conversion systems and particularly to AC to DC forward converters.

BACKGROUND OF THE INVENTION

The widespread use of switched mode power supplies and other factors has contributed to unwanted harmonics placed on the power system to which such loads are connected. Harmonic line current standards such as IEC 555-2 for switched mode power supplies has resulted in the adoption of designs by several manufacturers of power supplies which achieve unity power factor. Various designs are available for improving the input waveform quality of power converters, including the use of an active switching converter and/or the use of passive filter elements at the power input stage. See e.g., K. Kit Sum, "Power Factor Correction for Single Phase Input Power Supplies" PCIM, December 1989, pp. 18-23, and J. J. Spangler, "A Power Factor Corrected MOSFET Multiple Output Flyback Switching Power Supply," Proceedings of Power Conversion International PCI Conference, October 1985.

A widely utilized circuit structure includes a boost converter between the high voltage rectifier at the utility end and the DC bus of the DC to DC converter. An example of such a system is shown in U.S. Pat. No. 4,437,146 to Carpenter entitled "Boost Power Supply Having Power Factor Correction Circuit". In such systems, the DC bus capacitor provides intermediate energy storage to smooth out the input power fluctuations. The DC to DC converter, in turn, provides high frequency isolation, voltage step down, and line and load regulation of the output voltage. The two transistor forward converter has been commonly used for the DC to DC converter at medium to high power levels. The use of two independent power stages inherently decouples the problems of input current shaping and output regulation, allowing these to be treated independently, and each is addressed by a different power stage. While such approaches are effective, the additional switching components required add cost to the overall system.

SUMMARY OF THE INVENTION

The power converter of the present invention integrates an input boost converter and an output forward converter into a single power stage, and provides a simplified circuit topology with only two active switches. Nonetheless, the circuit is capable of obtaining unity power factor when operated to provide input line current control with reasonable output regulation, or of providing complete output regulation and close to unity power factor on the input line.

The converter of the invention includes an input rectifier providing rectified voltage to a input inductor which supplies current to a main node. Current is provided from the main node through a diode to a DC bus supply line, and a DC bus return line returns current to the rectifier. An energy storage capacitor is connected across the DC bus lines. Also connected across the DC bus lines is a first controllable switching device and a diode. The primary of a high frequency transformer is connected between the junction between the first switching device and the diode and the main node. The secondary of the transformer is connected to a rectifier which provides rectified current to an inductor and capacitor filter which supply the DC output voltage to a load. A second gate controlled switching device, such as a transistor, is connected between the main node and the return DC bus line. No other active switches are required.

In operation, the second switching device is turned on (for a short period of time compared to the period of the AC input power) to conduct current to the input inductor and then is turned off to drive current from the inductor into the DC bus supply line to charge up the energy storage capacitor. When the first and second switching devices are both turned on, the capacitor discharges via the switching devices through the transformer to supply power to the load. Each of the switching devices must be off for a period of time sufficient to recharge the capacitor and reset the transformer core so that the transformer magnetizing current is driven to zero every cycle, or typically at least as long as the period of time of forward power transfer from the capacitor through the transformer when both switches are turned on. However, the switches do not need to be turned on and off simultaneously, and the control of the time of turn-on and turn-off of the two switches allows control of input line current or of output voltage supplied to the load.

The controller for the converter of the invention can control the switching devices either to provide sinusoidal input currents which track the input voltage to yield unity power factor with loose regulation of the output voltage, or to provide tight regulation of the output voltage while nonetheless achieving very high power factors on the input power. This control is achieved with only two switches rather than the minimum of three switching devices required in conventional converter circuits employing a boost converter.

Further objects, features and advantages of the invention will be apparent from the following detailed description when taken in conjunction with the accompanying drawings.

BRIEF DESCRIPTION OF THE DRAWINGS

In the drawings:

FIG. 1 is a schematic circuit diagram of the unity power factor forward converter power circuit in accordance with the present invention.

FIG. 2 are graphs showing the input voltage waveform and the range of output voltage control available for a boost ratio of $V_p/V_{dc}=0.66$.

FIG. 3 are graphs illustrating the input voltage waveform and range of output voltage control available for a boost ratio of $V_p/V_{dc}=0.5$.

DETAILED DESCRIPTION OF THE INVENTION

Figures 4, 5:
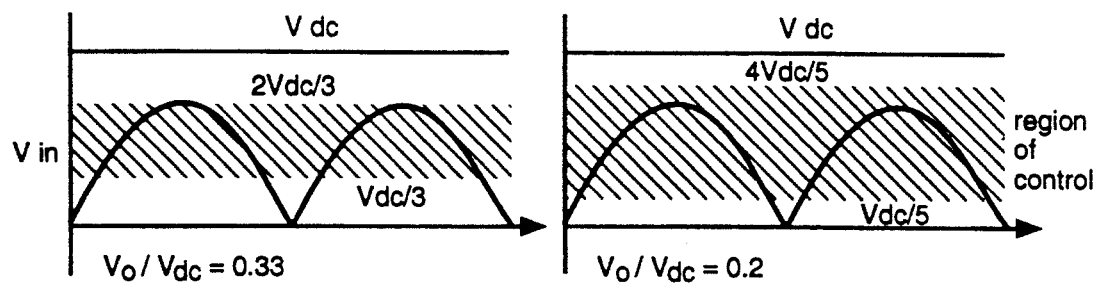
FIG. 4 is a graph illustrating the input voltage waveform and the range of control available for a voltage transfer ratio of $V_o/V_{dc}=0.33$.
FIG. 5 is a graph illustrating the input voltage waveform and the range of control available for a voltage transfer ratio of $V_o/V_{dc}=0.2$.

The power circuit of the unity power factor forward converter of the present invention is shown generally at 10 in a schematic circuit diagram in FIG. 1. The converter circuit 10 receives single phase AC input power on input lines 11 and 12. This power is rectified by a full bridge rectifier comprised of diodes 13, 14, 15 and 16 to provide DC voltage on an output line 18 and a return line 19. The current on the line 18 is provided to an input inductor 21. The current from the inductor 21 flows into a main node 22. A rectifying diode 24 is connected between the main node 22 and a supply DC bus line 25. The return line 19 serves as the return DC bus line. An energy storage capacitor 27 is connected across the DC bus lines 25 and 19. Also connected across the DC bus lines is a controlled switching device 29 and a diode 30, joined together at a node 31. The switching device 29 may be any of various gate turnoff switching devices, such as a MOSFET. A high frequency transformer 34 has its primary 35 connected between the node 31 joining the switching device 29 and the diode 30 and the main node 22. A second switching device 32 (e.g., a power MOSFET) is connected between the main node 22 and the DC bus return line 19. The secondary 36 of the transformer 34 provides its output to a rectifying diode 40 which supplies DC voltage to a filter, comprised of a series inductor 41 and a parallel capacitor 42, which provides a DC output voltage $V_o$ to a load illustratively shown as the resistor 43 in FIG. 1. A bypass diode 44 is also connected across the inductor 41 and capacitor 42. In the present invention, control signals are applied to the gates of the first and second switching devices 29 and 32, respectively, to provide DC power to the load 43 from the AC input lines 11 and 12 with substantially unity power factor at the AC input lines 11 and 12 and either input line current control or output voltage control. A typical switching frequency is 20 KHz to 100 KHz.

The present invention addresses the problem of controlling two independent quantities: the input line current (the current on the lines 11 and 12) and the output voltage $V_o$. To understand the present invention, it is helpful to identify degrees of freedom which can be exploited to give the desired control function. The most important restriction in the converter circuit 10 is related to the high frequency transformer 34. Resetting of the transformer core by driving the transformer magnetizing current to zero must be done every cycle. This dictates that the two switches 29 and 32 typically need to be off for at least as long as the forward power transfer period. However, there is no requirement that both switches be turned on and off simultaneously. This degree of freedom is used to obtain the control functions desired.

Figure 9:
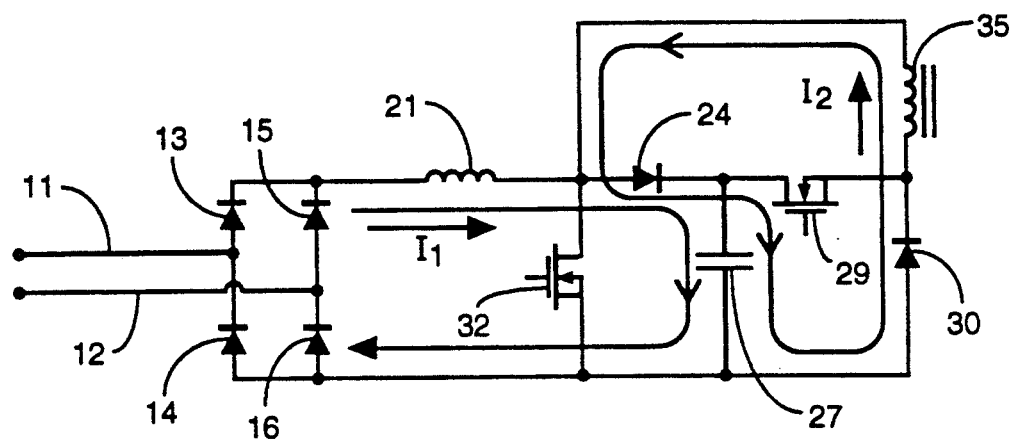
FIGS. 9-12 are simplified circuit diagrams of the converter power circuit showing the current paths through the circuit for the four modes of the controllable switches.
Figure 10:
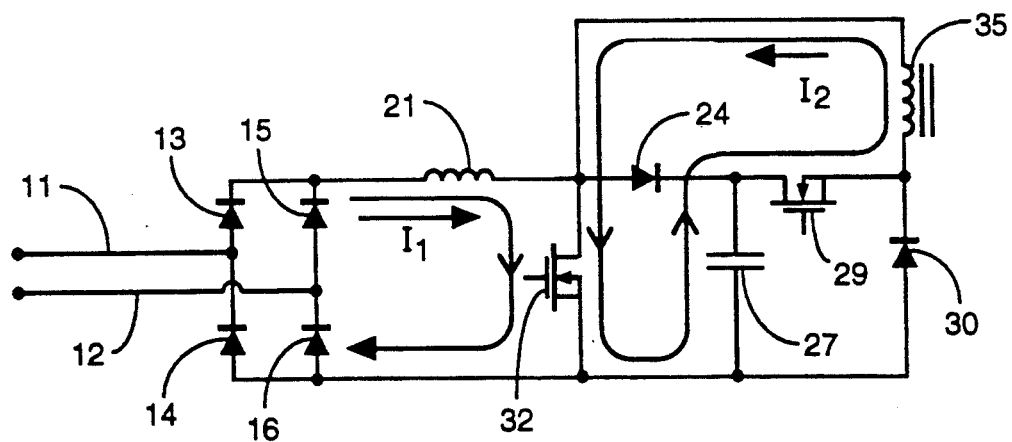
Figure 11:
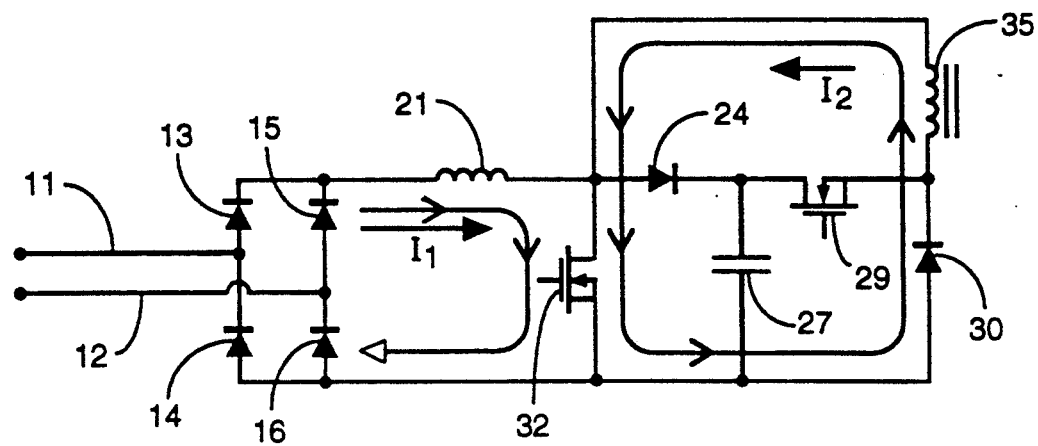
Figure 12:
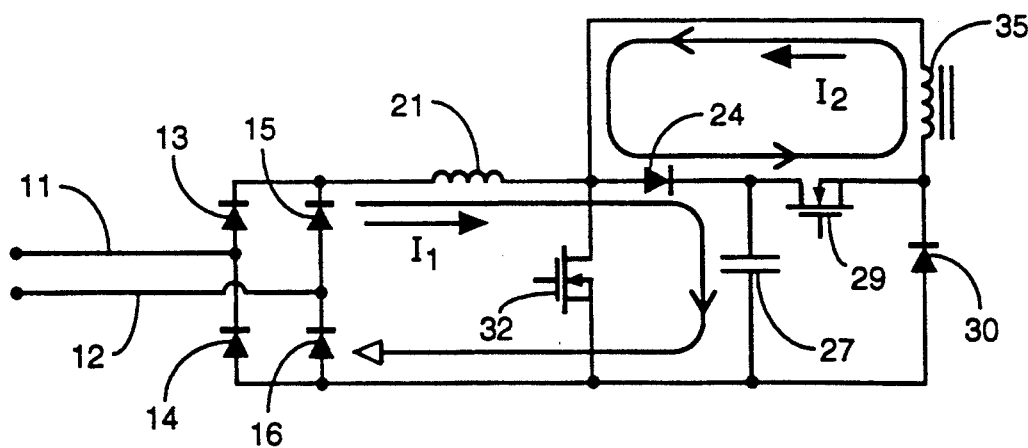

The four possible modes of operation of the converter power circuit as a function of the states of the switches 29 and 32 are shown in FIGS. 9-12, where the current through the input inductor 21 is denoted as $I_1$, and the current through the primary 35 of the transformer is denoted $I_2$. In the mode of FIG. 9, switches 29 and 32 are both off, and the currents $I_1$, and $I_2$ flow into the capacitor 27 until it charges sufficiently to back bias the diode 24. This is the primary capacitor charge mode of the circuit, and in this mode the primary current $I_2$. In the mode of FIG. 10, the switches 29 and 32 are both on, discharging the capacitor by transferring energy therefrom to the transformer, and building up the current $I_1$, through the input inductor 21. FIG. 11 illustrates an intermediate mode in which switch 29 is off and switch 32 is on, allowing the transformer current $I_2$ to freewheel and building up the current $I_1$, through the input inductor 21. An alternative intermediate mode is illustrated in FIG. 12 in which the switch 29 is on and the switch 32 is off. In this mode the primary current $I_2$ freewheels and the capacitor is charged by the current $I_1$ until the voltage on the capacitor back biases the diode 24. It is apparent that the time spent in the charging modes of FIGS. 9 or 12 (or both) during each cycle must be sufficient to recharge the capacitor 27 and generally bring the current $I_2$ to zero. However, the length of time spent in each of the modes and the availability of the intermediate modes of FIGS. 11 and 12, allows control of the input current or output voltage.

One important limitation in the control arises from the fact that the input AC voltage reduces to zero volts twice every cycle. Under these conditions it is not possible simultaneously to control the input current to be sinusoidal and to ensure no low frequency component in the rectified output voltage. However, one of the two tasks can be successfully performed. Which task is given priority is application dependent. For instance, in a bulk power converter application, as in a preconditioner, output ripple specifications may not be too stringent. On the other hand, it can be shown that giving output regulation priority, very high power factors nonetheless can be achieved on the input lines.

If $d$ is defined to be the duty ratio of the switch 29 and $V_i$ and $V_{dc}$ are the instantaneous values of the input rectified AC voltage and the DC bus voltage, respectively, volt-second balance across the inductor 21 yields the following relation:

$$(1-d) V_{dc} = V_i \quad (1)$$

Similarly, if $d'$ is the duty ratio of the switch 32, and $V_o$ is the output voltage, $$d' V_{dc} = V_o \quad (2)$$

under the transformer core reset constraint $$d' \leq d'_{max} = 0.5 - |0.5 - d| \quad (3)$$

with a unity turns ratio transformer. From relation 1, it is clear that $V_{dc}$ can be controlled to be any desired value above the peak $V_p$ of the input rectified AC voltage waveform.

If input current regulation is made the priority of control, $$d = 1 - |V_p \sin \omega t / V_{dc}| \quad (4)$$

This causes the constraint equation to take the form $$d'_{max} = 0.5 - |0.5 - |V_p \sin \omega t / V_{dc}|| \quad (5)$$

Also $$V_{omax} = V_{dc} (0.5 - |0.5 - |V_p \sin \omega t / V_{dc}||) \quad (6)$$

FIGS. 2 and 3 show $d'_{max}$ as a function of time for $V_p/V_{dc}=0.66$ and 0.5, respectively.

On the other hand, if one chooses to have output regulation take priority over input regulation, the output voltage $V_o$, can be controlled to be any value below $V_{dc}/2$. In this case:

$$D' = V_o/V_{dc} \tag{7}$$

The constraint for this mode of operation is $$d' = d_{min} \leq d \leq d_{max} = (1-d') \tag{8}$$

Control over input current is available in the intervals when the input AC voltage is between $V_{imin}$ and $V_{imax}$, where $$V_{imin} = d'V_{dc} \tag{9}$$

$$V_{imax} = (1-d')V_{dc} \tag{10}$$

Figure 6:
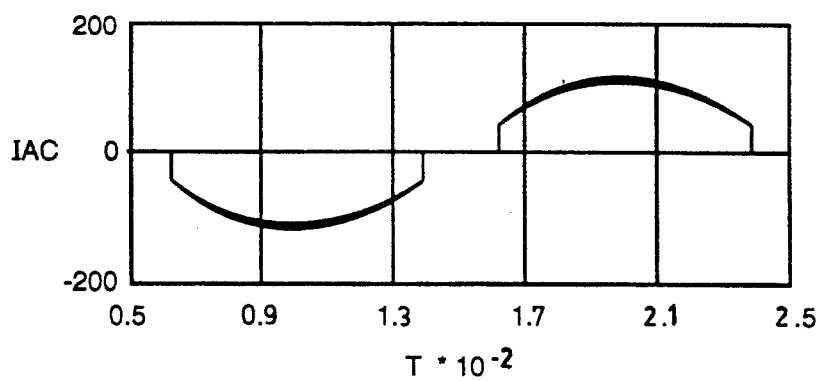
FIG. 6 is a graph showing the input current waveform under output voltage control over an entire cycle of input current.
Figure 7:
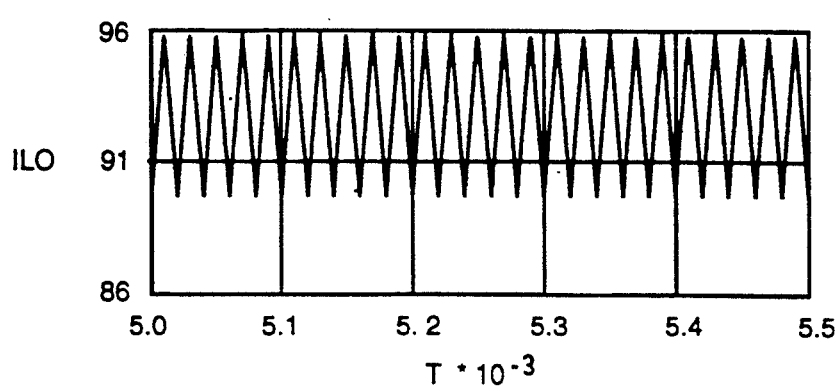
FIG. 7 is a graph illustrating a portion of the input current waveform of FIG. 6 on expanded time axis.

FIGS. 4 and 5 show the range over which control is available as a function of time for $V_o/V_{dc}=0.33$ and 0.2, respectively, where $V_p/V_{dc}=0.66$. It may be noted that control over the input current is maintained over a very large part of the cycle, and control is lost only when the input voltage is near zero volts. This ensures that the input current does not change significantly over the period when control is lost. FIGS. 6 and 7 show simulated waveforms of the overall input current and the high frequency portion thereof, respectively, which demonstrate that while operating with output voltage control priority, the input line current is close to sinusoidal and has a high power factor of 0.95 to 0.98, substantially unity power factor.

It is clear from FIGS. 4 and 5 that reducing the output voltage significantly enhances the control range on the input side. On the other hand, reducing the output voltage to improve line current adversely impacts the ratings of both the switching devices and the transformer.

Both of the switching devices 29 and 32 are rated to handle the maximum storage capacitor voltage $V_{dc}$. When conducting, the switch 32 carries a maximum current of $I_p+I_o$, where $I_p$ is the peak input current and $I_o$ is the output current to the load (assuming a unity turns ratio transformer). The switch 29 carries a peak current of $I_o$, if transformer magnetization current is neglected. Assuming no converter losses, the input power $P_{in}$ is equal to the output power $P_o$.

$$P_{in} = \frac{V_p I_p}{2} \tag{11}$$

and $$I_p = \frac{2 P_o}{V_p} \tag{12}$$

The volt-ampere (VA) rating per unit of the switch 32 is $P_{d2}$, where $$P_{d2} = V_{dc}(I_p+I_o) \tag{13}$$

Similarly, for the switch 29, the VA rating per unit of $P_{d1}$ is $$P_{d1} = V_{dc}I_o \tag{14}$$

Table 1 below shows exemplary numerical values of $P_{d2}$ and $P_{d1}$ for $V_{dc} \leq 2 V_p$.

TABLE 1

| 1 | Vdc/Vp | Pd2 | Pd1 | Total |
|---|--------|-----|-----|-------|
| 2 | 1 | 6.99442633 | 4.99442633 | 11.9888527 |
| 3 | 1.1 | 6.35074357 | 4.15074357 | 10.5014871 |
| 4 | 1.2 | 6.08113501 | 3.68113501 | 9.76227002 |
| 5 | 1.3 | 5.99447142 | 3.39447142 | 9.38894285 |
| 6 | 1.4 | 5.01270903 | 3.21270903 | 9.22541805 |
| 7 | 1.5 | 6.0985569 | 3.0985569 | 9.1971138 |
| 8 | 1.6 | 6.23261638 | 3.03261638 | 9.26523275 |
| 9 | 1.7 | 6.40475213 | 3.00475213 | 9.40950426 |
| 10 | 1.8 | 6.61075471 | 3.01075471 | 9.62150942 |
| 11 | 1.9 | 6.85212453 | 3.05212453 | 9.90424906 |
| 12 | 2 | 7.14500891 | 3.14500891 | 10.2900178 |

The data from the table show that the total device rating is 9.2 p.u. for $V_{dc}=1.5 V_p$, and that the total does not change sharply as $V_{dc}$ is varied. For a 115 volt AC input, MOSFET switching devices may be used up to 2 KW power ratings, for example, with $V_{dc}=250$ volts for $V_{dc}=1.5 V_p$.

Figure 8:
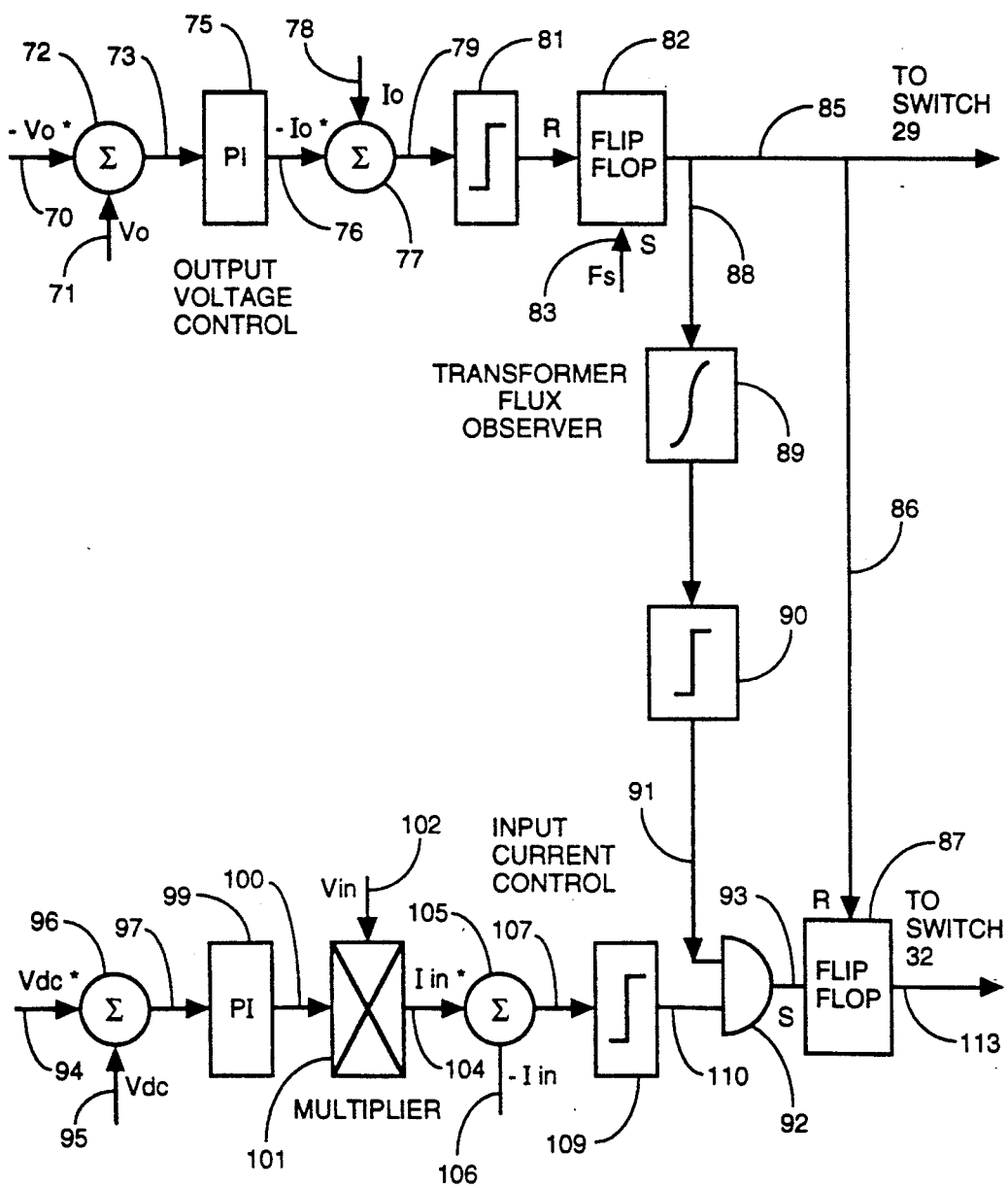
FIG. 8 is a block diagram of a current mode controller for the converter of the present invention.

A block diagram of an exemplary controller for controlling the switching of the switching devices 29 and 32 is shown in FIG. 8. A voltage value $V_o$ representing the desired output voltage is provided (e.g., from a potentiometer) on a line 70 to a negative input of a summing junction 72 and the actual output voltage $V_o$ across the load 43 is provided on line 71 to the summing junction 72. The output of the summer 72 on a line 73 is provided to a proportional-integral controller 75. The output of the controller 75 on a line 76 is provided to a negative input of a summing junction 77 which also receives a signal on a line 78 indicating the output current $I_o$ from a current sensor. The output of the summing junction 77 on a line 79 is provided to a limiter 81, and the output of the limiter is provided to the reset input of a flip-flop 82 which receives at its set input the system oscillator switching signal $F_s$ (e.g., at 20 KHz) on a line 83. The output of the flip-flop 82 on a line 85 is provided to the gate of the switching device 29. This signal is also provided on a line 86 to the reset input of a flip-flop 87. The signal on the line 85 is also provided on a line 88 to an integrator 89, the output of which is provided to a limiter 90. The output of the limiter on a line 91 is provided to one input of an AND gate 92, the output of which, on a line 93, provides the set input to the flip-flop 87. The second loop of the controller receives the desired DC bus voltage $V_{dc}$ (e.g., from a potentiometer) on a line 94 and the actual DC bus voltage $V_{dc}$ on a line 95 at a summing junction 96. The output of the summer 96 on a line 97 is provided to a proportional—integral controller 99, which provides an output signal on a line 100 to a multiplier 101. The other input of the multiplier 101 is the input voltage $V_{in}$ across the input terminals provided on a line 102. The output of the multiplier 101, on a line 104, is provided to a summing junction 105 which also receives on a line 106 an input current signal $I_n$ from a current sensor on the input lines. The output of the summer 105 on a line 107 is provided to a limiter 109, and the output of the limiter is provided on a line 110 to the other input of the AND gate 92. The output of the flip-flop 87 is provided on a line 113 to the gate of the switching device 32.

The forward power transfer is controlled via the inner current control loop operating at constant switching frequency (e.g., at 20 KHz to 100 KHz), with an outer P-I regulator that regulates the output voltage. This control scheme practically rejects all of the ripple in the intermediate DC bus voltage. The intermediate DC bus voltage is regulated by the second P-I controller which generates a magnitude command for the input current. This is shaped to follow the input voltage using the multiplier. This generates the switching signal for the boost transistor 32, in conjunction with the transformer flux observer to ensure demagnetization over each switching cycle.

In summary, the converter of the present invention features the following desirable properties: single stage power conversion, unity power factor input, good output voltage regulation, reasonable device and transformer ratings, and the capability of higher efficiency than cascaded converter stages.

It is understood that the invention is not confined to the particular embodiments set forth herein as illustrative, but embraces such modified forms thereof as come within the scope of the following claims.

What is claimed is:

1. An AC to DC forward converter comprising:
   (a) input rectifying means for receiving AC voltage on AC input lines and rectifying the voltage to a DC time varying voltage on output lines from the rectifying means;
   (b) an input inductor receiving the DC voltage from the rectifying means on one of the output lines from the rectifying means and providing current therefrom to a main node;
   (c) a DC bus supply line and DC bus return line, the DC bus return line connected to one of the output lines from the rectifying means to return current to the rectifying means;
   (d) a diode connected between the main node and the DC bus supply line to provide current from the input inductor through the diode to the DC bus supply line;
   (e) an energy storage capacitor connected across the DC bus lines;
   (f) a first controllable switching device and a diode connected together at a node and connected across the DC bus lines;
   (g) a second controllable switching device connected from the main node to the DC bus return line;
   (h) a high frequency transformer having a primary and a secondary, the primary connected between the node connecting the first switching device and the diode and the main node;
   (i) output rectifying means connected to the secondary of the transformer for rectifying the output voltage of the secondary to provide a DC voltage to a load; and
   (j) control means for controlling the switching of the first and second switching devices to provide alternate cyclic periods of charging of the energy storage capacitor and selected discharging of the capacitor through the primary of the transformer via the switching devices when both switching devices are turned on, wherein the switching devices are turned off during each cycle at least long enough to drive the transformer magnetizing current to zero.

2. The converter of claim 1 wherein the switching devices are controlled to provide substantially sinusoidal input current from the AC input lines through the input rectifying means.

3. The converter of claim 1 wherein the switching devices are controlled by the control means to switch to provide substantially unity power factor at the AC input lines to the input rectifying means.

4. The converter of claim 1 wherein the control means controls the switching of the switching devices to provide control of the output voltage from the output rectifying means to maintain a desired output voltage to a load.

5. The converter of claim 1 wherein the controlled switching devices are MOSFETs.

6. The converter of claim 1 wherein the input rectifying means comprises four diodes connected in a full bridge configuration.

7. The converter of claim 1 wherein the output rectifying means comprises a diode connected to the secondary of the transformer to rectify the output therefrom, and further including an output inductor connected in series with the diode and with the load and a capacitor connected in parallel with the load.

8. The converter of claim 1 wherein the control means controls the two switching devices so that they are not turned on and off simultaneously.

* * * * *

UNITED STATES PATENT AND TRADEMARK OFFICE
CERTIFICATE OF CORRECTION

PATENT NO. : 5,224,025

DATED : June 29, 1993

INVENTOR(S) : Divan, et al.

It is certified that error appears in the above-identified patent and that said Letters Patent is hereby corrected as shown below:

1. In column 2, line 67 of the patent, delete "input" and insert in its place --output--.

2. In column 2, line 68 of the patent, after "current waveform" delete "of Fig. 6 on expanded time axis".

3. In column 4, line 4 of the patent, after "primary current $I_2$" insert --goes to zero.--.

4. In column 4, line 11 of the patent, after "current $I_1$" delete ",".

5. In column 5, line 8 of the patent, "$D'=V_o/V_{dc}$" should be --$d'=V_o/V_{dc}$--, as written in the application on page 11, line 3.

6. In column 5, line 31 of the patent, "high frequency portion thereof," should be deleted and --output current $I_o$,-- should be inserted in its place.

UNITED STATES PATENT AND TRADEMARK OFFICE
CERTIFICATE OF CORRECTION

PATENT NO. : 5,224,025
DATED : June 29, 1993
INVENTOR(S) : Divan, et al.

It is certified that error appears in the above-indentified patent and that said Letters Patent is hereby corrected as shown below:

7. In column 6, line 11 of the patent, "5.01270903" should be --6.01270903--,

8. In column 6, line 26 of the patent, "$V_o$" should be --$V_o^*$--.

9. In column 6, line 50 of the patent, delete "$V_{dc}$" and insert in its place --$V_{dc}^*$--.

Signed and Sealed this

Twelfth Day of July, 1994

Attest:

BRUCE LEHMAN

*Attesting Officer*   *Commissioner of Patents and Trademarks*